United States Patent
Balachandran et al.

(10) Patent No.: US 11,474,532 B2
(45) Date of Patent: Oct. 18, 2022

(54) SYSTEMS AND METHODS FOR DETECTING ANOMALIES IN A VEHICLE SYSTEM

(71) Applicant: Toyota Research Institute, Inc., Los Altos, CA (US)

(72) Inventors: Avinash Balachandran, Sunnyvale, CA (US); Carrie Bobier-Tiu, Sunnyvale, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 68 days.

(21) Appl. No.: 16/376,486

(22) Filed: Apr. 5, 2019

(65) Prior Publication Data

US 2020/0216084 A1 Jul. 9, 2020

Related U.S. Application Data

(60) Provisional application No. 62/789,008, filed on Jan. 7, 2019.

(51) Int. Cl.
*G05D 1/02* (2020.01)
*G06K 9/00* (2006.01)
(Continued)

(52) U.S. Cl.
CPC ....... *G05D 1/0238* (2013.01); *B60W 50/0097* (2013.01); *B60W 50/0205* (2013.01); *B60W 50/029* (2013.01); *B60W 50/14* (2013.01); *G05D 1/0055* (2013.01); *G05D 1/0088* (2013.01); *G05D 1/0212* (2013.01);
(Continued)

(58) Field of Classification Search
CPC ............... G05D 1/0238; G05D 1/0055; G05D 1/0088; G05D 1/0212; G05D 1/0231; G05D 1/0255; G05D 1/0257; G05D 2201/0213; G06K 9/00798; G06K 9/00805; G07C 5/0808; B60W 50/0097; B60W 50/0205; B60W 50/029; B60W 50/14;
(Continued)

(56) References Cited

U.S. PATENT DOCUMENTS

8,126,642 B2 2/2012 Trepagnier
9,754,325 B1 9/2017 Konrardy
(Continued)

*Primary Examiner* — Jelani A Smith
*Assistant Examiner* — Frank T Glenn, III
(74) *Attorney, Agent, or Firm* — Christopher G. Darrow; Darrow Mustafa PC (57) ABSTRACT

System, methods, and other embodiments described herein relate to improving the prediction efficiency of autonomous/semi-autonomous vehicles. In one embodiment, the system generates a provisional prediction according to sensor data from at least one sensor of a subject vehicle. The prediction can be associated with an aspect relating to operating the subject vehicle along a path. The system analyzes the provisional prediction in relation to a subsequent prediction about the aspect to determine a correspondence between the provisional prediction and the subsequent prediction. In response to determining that the correspondence satisfies an inaccuracy threshold, the system can store the provisional prediction and the sensor data associated with the provisional prediction to log potential inaccuracies in generating predictions based, at least in part, on the sensor data.

18 Claims, 6 Drawing Sheets

(51) Int. Cl.
| | |
|---|---|
| *G05D 1/00* | (2006.01) |
| *B60W 50/00* | (2006.01) |
| *B60W 50/02* | (2012.01) |
| *B60W 50/029* | (2012.01) |
| *G07C 5/08* | (2006.01) |
| *G06V 20/58* | (2022.01) |
| *G06V 20/56* | (2022.01) |
| *B60W 50/14* | (2020.01) |

(52) U.S. Cl.
CPC ............ *G06V 20/58* (2022.01); *G06V 20/588* (2022.01); *G07C 5/0808* (2013.01); *B60W 2050/0083* (2013.01); *B60W 2050/021* (2013.01); *B60W 2050/0215* (2013.01); *B60W 2050/146* (2013.01); *G05D 1/0231* (2013.01); *G05D 1/0255* (2013.01); *G05D 1/0257* (2013.01); *G05D 2201/0213* (2013.01)

(58) Field of Classification Search
CPC ... B60W 2050/0083; B60W 2050/021; B60W 2050/0215; B60W 2050/146
See application file for complete search history.

(56) References Cited

U.S. PATENT DOCUMENTS

| | | | |
|---|---|---|---|
| 10,768,621 | B1 * | 9/2020 | Nix ...................... G05D 1/0088 |
| 2013/0345871 | A1 * | 12/2013 | Kimura .................. B25J 9/1694 |
| | | | 700/258 |
| 2017/0295446 | A1 * | 10/2017 | Thagadur Shivappa .................... |
| | | | H04S 7/303 |
| 2018/0314947 | A1 | 11/2018 | Morris et al. |
| 2018/0339712 | A1 | 11/2018 | Kislovskiy et al. |
| 2018/0342113 | A1 | 11/2018 | Kislovskiy et al. |
| 2020/0031371 | A1 * | 1/2020 | Soliman ................. B60W 40/09 |
| 2020/0097841 | A1 * | 3/2020 | Petousis ................... G06N 5/04 |
| 2020/0148201 | A1 * | 5/2020 | King ...................... B60W 30/09 |

* cited by examiner

SYSTEMS AND METHODS FOR DETECTING ANOMALIES IN A VEHICLE SYSTEM

CROSS-REFERENCE TO RELATED APPLICATIONS

This application is based upon and claims the benefit of priority of U.S. Provisional Application No. 62/789,008, filed on Jan. 7, 2019, the entire contents of which are incorporated herein by reference.

TECHNICAL FIELD

The subject matter described herein relates, in general, to a system and method for detecting anomalies in a vehicle control system, and, more particularly, to detecting inaccurate predictions and/or perceptions.

BACKGROUND

Improving autonomous/semi-autonomous vehicle operation can involve identifying long-tail events and fringe circumstances in which the vehicle encounters problems and determining how to resolve those problems through analysis of data about the circumstances. As a general principle, obtaining data about these fringe/rare circumstances is useful to develop an understanding of why the vehicle encounters problems in relation to those circumstances. However, collecting data about these events can be difficult for the same reasons that they are of interest, i.e., the rarity of the events and associated difficulty of determining the occurrences of the events.

An example rare event involves inaccurate predictions that are not acted upon. Autonomous/semi-autonomous vehicle systems can include sensors that obtain data about an environment and control systems that make predictions based on the sensor data. Some of the predictions may not match the actual events that unfold, but as sensor data is continuously collected and analyzed subsequent predictions may be generated that are accurate. In these circumstances, the vehicle can ultimately take a correct action and leave little trace of the erroneous prediction since no fault occurs, making detection and correction of the erroneous prediction a particularly difficult task.

SUMMARY

Example systems and methods relating to detecting inaccurate predictions generated in an autonomous/semi-autonomous vehicle system are disclosed herein. In one embodiment, a supervisory system for a subject vehicle is disclosed. The supervisory system includes one or more processors and a memory communicably coupled to the one or more processors. The memory stores a perception module including instructions that when executed by the one or more processors cause the one or more processors to generate a provisional prediction according to sensor data from at least one sensor of a subject vehicle. The prediction can be associated with an aspect relating to operating the subject vehicle along a path. The memory stores a monitoring module including instructions that when executed by the one or more processors cause the one or more processors to analyze the provisional prediction in relation to a subsequent prediction about the aspect to determine a correspondence between the provisional prediction and the subsequent prediction, and in response to determining that the correspondence satisfies an inaccuracy threshold, store the provisional prediction and the sensor data associated with the provisional prediction to log potential errors in generating predictions based, at least in part, on the sensor data.

In one embodiment, a method is disclosed. The method includes generating a provisional prediction according to sensor data from at least one sensor of a subject vehicle, the prediction being associated with an aspect relating to operating the subject vehicle along a path. The method further includes analyzing the provisional prediction in relation to a subsequent prediction about the aspect to determine a correspondence between the provisional prediction and the subsequent prediction. The method also includes, in response to determining that the correspondence satisfies an inaccuracy threshold, storing the provisional prediction and the sensor data associated with the provisional prediction to log potential errors in generating predictions based, at least in part, on the sensor data.

In one embodiment, a non-transitory computer-readable medium for detecting inaccurate predictions is disclosed. The non-transitory computer-readable medium includes instructions that when executed by one or more processors cause the one or more processors to perform one or more functions. The instructions include instructions to generate a provisional prediction according to sensor data from at least one sensor of a subject vehicle, the prediction being associated with an aspect relating to operating the subject vehicle along a path. The instructions include instructions to analyze the provisional prediction in relation to a subsequent prediction about the aspect to determine a correspondence between the provisional prediction and the subsequent prediction. The instructions also include instructions to store, in response to determining that the correspondence satisfies an inaccuracy threshold, the provisional prediction and the sensor data associated with the provisional prediction to log potential errors in generating predictions based, at least in part, on the sensor data.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with detecting inaccurate predictions is disclosed. As previously described, a subject vehicle, such as an autonomous or semi-autonomous vehicle, may generate predictions related to operations of the subject vehicle traveling along a path. Such predictions can be based, at least in part, on data obtained from one or more sensors of the subject vehicle, e.g., a camera, lidar, radar, thermal sensor, etc. The predictions can also factor in other types of information, such as the current speed of the subject vehicle, the capabilities (e.g., turn radius, braking) of the subject vehicle, external conditions (e.g., daylight/night, weather, time) and the like. The predictions can apply to a wide range of issues. For example, the predictions can apply to a movement of an object detected in the data generated by the one or more sensors, a position relative to the subject vehicle of the object detected in the data generated by the one or more sensors, an action of an agent detected in the data generated by the sensor system, or other types of activities.

For example, in one scenario, the subject vehicle may analyze sensor data, identify an obstacle (e.g., a tree branch) in the path ahead of the vehicle, and provisionally predict that the subject vehicle, at its current speed and trajectory, will collide with the obstacle in seven seconds. The vehicle can generate an action command in response to the prediction to reduce, for example, speed and change lanes in three seconds.

However, the vehicle may generate a subsequent prediction that contradicts the provisional prediction. For example, two seconds after the provisional prediction, the subject vehicle can analyze additional sensor data, determine that no obstacle lies in the path ahead and predict that the subject vehicle is clear to maintain a current speed and trajectory. This change in predictions can be due, for example, to an adjustment in understanding of the sensor data by the subject vehicle, whether due to changes in direct perceptions (e.g., information in the sensor data), adjustments in internal reasoning, detection of a malfunction, or other causes. The subject vehicle may have, therefore, incorrectly perceived the obstacle, incorrectly calculated an interaction according, for example, to an underlying inaccurate or undeveloped internal understanding of a model, etc. In any case, the provisional prediction was inaccurate, however, since the subject vehicle managed to self-correct during the course of operation, no tangible fault or accident manifested due to the inaccurate prediction. This lack of an erroneous outcome can make detection of the inaccurate prediction difficult, leaving the underlying source of the inaccuracy undetected and unresolved.

The supervisory system can detect inaccurate predictions, even when no visible error has occurred as a result of the inaccurate prediction. The supervisory system can collect data about the inaccurate prediction for further analysis to uncover and resolve the source of the inaccuracy by, for example, further training various prediction/perception models vehicle to accurately recognize the circumstances leading to the inaccurate predictions. Furthermore, the data can be collected and aggregated from multiple vehicles to improve the ability to detect trends that illuminate hidden and possibly otherwise undetectable problem sources.

Accordingly, the supervisory system described herein can improve the prediction efficiency (e.g., accuracy and precision) of autonomous/semi-autonomous systems of vehicles, thereby improving overall functioning of the vehicles when operating in autonomous/semi-autonomous modes. In one embodiment, the system generates a provisional prediction according to sensor data from at least one sensor of a subject vehicle. The prediction can be associated with an aspect relating to operating the subject vehicle along a path. The system analyzes the provisional prediction in relation to a subsequent prediction about the aspect to determine a correspondence between the provisional prediction and the subsequent prediction. In response to determining that the correspondence satisfies an inaccuracy threshold, the system can store the provisional prediction and the sensor data associated with the provisional prediction to log potential errors in generating predictions based, at least in part, on the sensor data.

Figure 1:
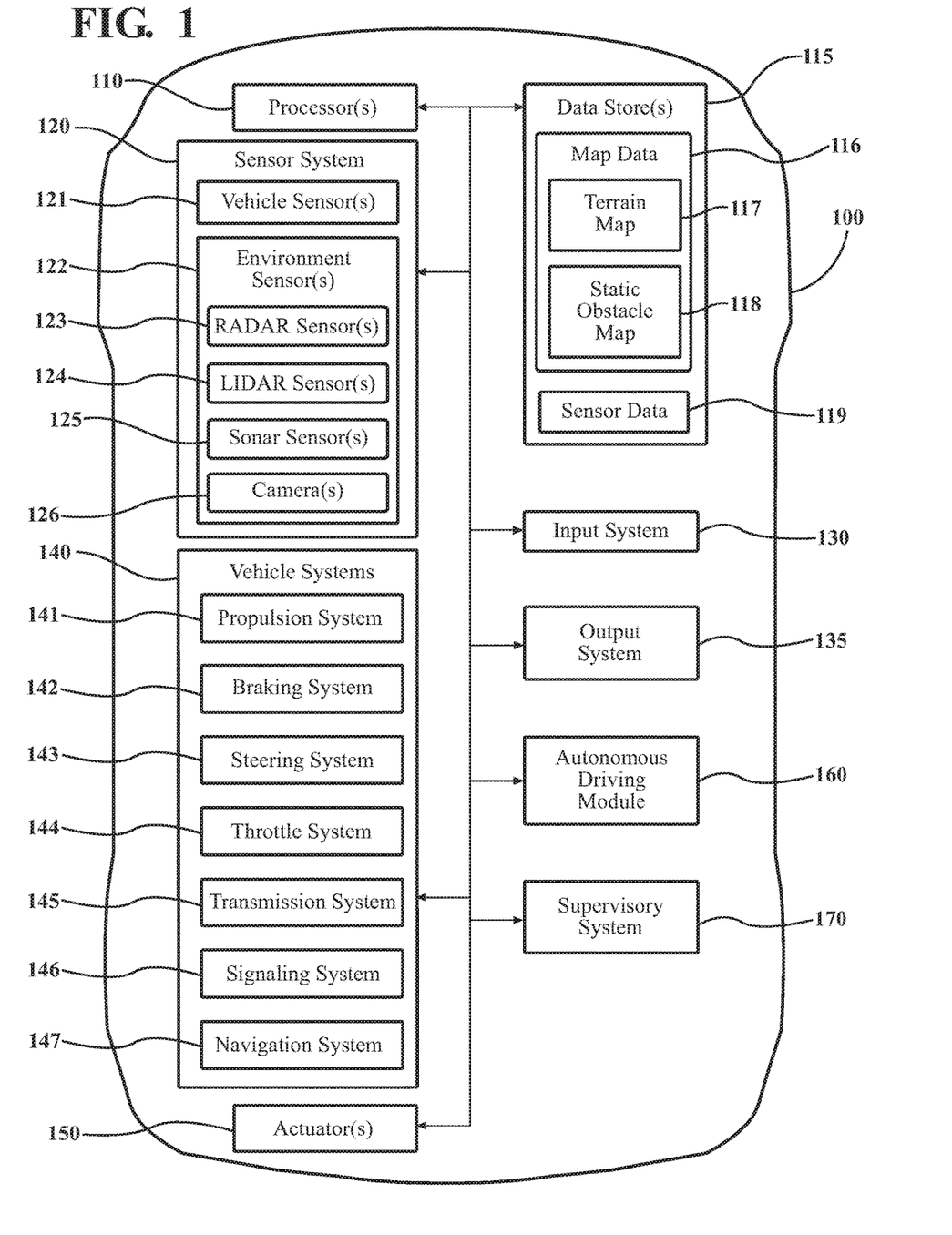
FIG. 1 illustrates one embodiment of a vehicle within which systems and methods disclosed herein may be implemented.

FIG. 1 shows an example vehicle 100 that can implement the disclosed path generating system. The vehicle 100 includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-4 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes an autonomous driving module 160 that is implemented to execute functions related to autonomous/semi-autonomous driving and a supervisory system 170 that is implemented to perform methods and other functions as disclosed herein relating to detecting, and, in some cases, correcting sources of inaccurate predictions generated for the vehicle 100 in the course of autonomous/semi-autonomous driving. The noted functions and methods will become more apparent with a further discussion of the figures.

Figure 2:
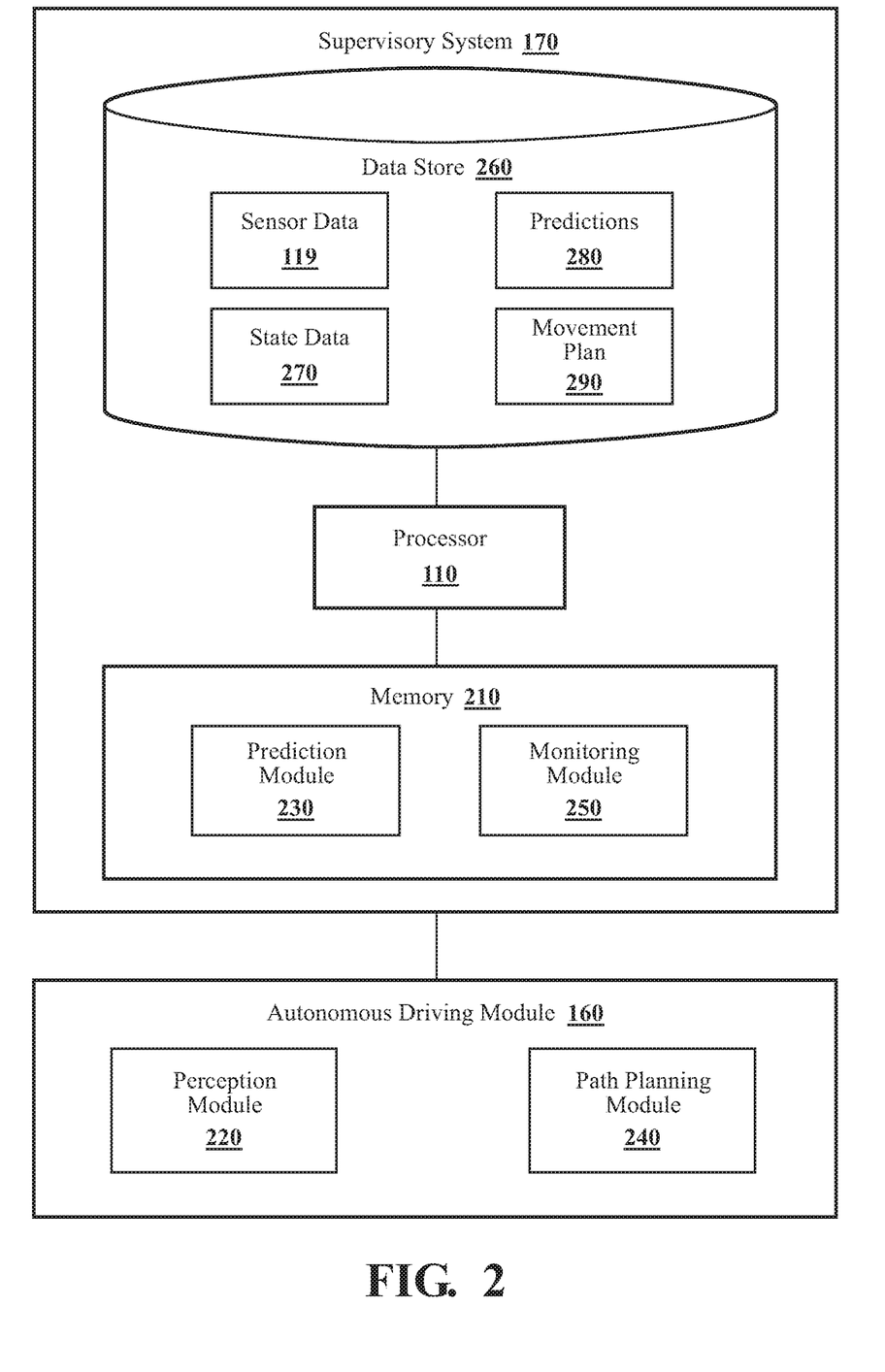
FIG. 2 illustrates one embodiment of a supervisory system according to the disclosed subject matter.

With reference to FIG. 2, one embodiment of the supervisory system 170 of FIG. 1 is further illustrated. The supervisory system is in communication with the autonomous driving module 160. The supervisory system 170 is shown as including a processor 110 from the vehicle 100 of FIG. 1. Accordingly, the processor 110 may be a part of the supervisory system 170, the supervisory system 170 may include a separate processor from the processor 110 of the vehicle 100 or the supervisory system 170 may access the processor 110 through a data bus or another communication path. It should be appreciated, that while the supervisory system 170 is illustrated as being a single contained system, in various embodiments, the supervisory system 170 is a distributed system that is comprised of components that can be provided as a centralized server, a cloud-based service, and so on.

In one or more embodiments, the supervisory system 170 includes a memory 210 that stores a perception module 220 (not illustrated in the memory 210), a prediction module 230, a path planning module 240, 240 (not illustrated in the memory 210), and a monitoring module 250. The memory 210 is a random-access memory (RAM), read-only memory (ROM), a hard-disk drive, a flash memory, or other suitable memory for storing the modules 220, 230, 240, and 250. The modules 220, 230, 240, and 250 are, for example, computer-readable instructions that when executed by the processor 110 cause the processor 110 to perform the various functions disclosed herein. Moreover, as previously noted, in various embodiments, one or more aspects of the supervisory system 170 are implemented as cloud-based services, and so on. Thus, one or more modules of the supervisory system 170 may be located remotely from other components and may be implemented in a distributed manner.

Furthermore, in one embodiment, the supervisory system 170 includes a data store 260, which is, in one embodiment, a database. The database is, in one embodiment, an electronic data structure stored in the memory 210 or another data store and that is configured with routines that can be executed by the processor 110 for analyzing stored data, providing stored data, organizing stored data, and so on. Thus, in one embodiment, the database 260 stores data used by the modules 220, 230, 240, and 250 in executing various functions. In one embodiment, the database includes sensor data 119 along with, for example, other information that is used and/or generated by the modules 220, 230, 240, and 250 such as predictions 280. Of course, in further embodiments, the various information may be stored within the memory 210 or another suitable location.

In one or more embodiments, the autonomous driving module 160 can include the perception module 220 and the path planning module 240. The perception module 220 can identify objects and generate state data 270 based on various inputs, such as sensor data 119 obtained from one or more environmental sensors 122 of the sensor system 120 of the vehicle 100, vehicle-to-vehicle (V2V) communications, vehicle-to-everything (V2X) communications, or other sources. The state data 270 describes current and/or past states of one or more objects detected within the surrounding environment of the vehicle 100. The state data 270 can include, for example, image data associated with a plurality of times (e.g., a plurality of images associated with subsequent points in time). The perception module 220 can enhance the state data 270 by combining the state data with geographic data associated with a geographic area in which the object is located (e.g., map data, satellite imagery, etc.). For example, the perception module 220 can project the state data 270 onto the geographic data such that the states of an object can be better evaluated within the context of the object's surroundings (e.g., relative to a sidewalk, lane boundaries, obstruction, etc.).

The prediction module 230 can generate a prediction 280 based on, at least in part, one or more different inputs, such as the state data 270, the sensor data 119, the current state (e.g., speed, trajectory) of the subject vehicle 100, the current date and time, the current location, the local weather, and other information. A prediction 280 can be associated with an aspect of operating the subject vehicle 100 along a path. For example, the aspect can relate to maneuvers that the subject vehicle 100 may execute along the path, events that may occur along the path, or occurrences that may intersect with or otherwise impact a current trajectory of the subject vehicle 100. Without limitation, the prediction 280 can indicate a predicted state, movement or trajectory of an object identified in the sensor data 119, a predicted position, relative to the subject vehicle 100, of the object detected in the sensor data 119, a predicted action of an agent detected in the sensor data 119, or other types of predictions. For example, a prediction 280 can indicate a predicted path associated with an object. The predicted path can indicate a trajectory along which the object is predicted to travel over time (and/or the speed at which the object is predicted to travel along the predicted path).

In one or more embodiments, to generate a prediction 280, the prediction module 230 can include, utilize, and/or otherwise leverage one or more algorithms and/or models. In one or more embodiments, the model can be a machine-learning model. For example, the machine-learning model can be or otherwise include one or more various models such as neural networks (e.g., deep neural networks), or other multi-layer non-linear models. Neural networks can include convolutional neural networks, recurrent neural networks (e.g., long short-term memory recurrent neural networks), feed-forward neural networks, and/or other forms of neural networks. In one or more embodiments, supervised training techniques can be performed to train the model to predict one or more future states, movements or locations of an object detected within the surrounding environment of the subject vehicle 100 (e.g., using labeled state data 270 or data derived therefrom, and geographic data with known future location(s) and/or trajectories).

For example, in one or more embodiments the prediction module 230 can input the state data 270 (e.g., derived from sensor data 119) into an algorithm or machine-learning model trained to predict how an object is likely to move. The prediction module 230 can use the algorithm or machine-learned model to analyze the state data 270 to predict a path and/or future position of the object based on the locations, headings, velocities, etc. indicated in the state data 270.

The output of the prediction module 230 is a prediction 280 that indicates one or more predicted future states or locations of an object. For example, a predicted future location can indicate a predicted trajectory of the object. A predicted trajectory can include a plurality of predicted future locations of an object at one or a plurality of future times. The predicted trajectory can therefore indicate a predicted motion of the object. In some implementations, the output can also indicate other predicted attributes of the object, such as a predicted speed or direction.

In some implementations, the prediction module 230 can determine and output a plurality of predictions 280 related to an object. The output can also include an indication of confidence levels associated with the predictions 280. A confidence level can indicate the prediction module's 230 uncertainty with respect to a particular prediction 280.

The path planning module 240 can generate a movement plan 290 for the autonomous vehicle based, at least in part, on one or more of the predictions 280. The movement plan 290 can include a planned trajectory, speed, acceleration, other actions, etc. of the vehicle 100, and can be generated with respect to objects proximate to the vehicle 100 and the predicted movements of such objects. That is, in one or more embodiments, given a prediction 280 about the future location(s) of one or more objects and information about the current status of the subject vehicle 100 (e.g., speed, trajectory, etc.), the path planning module 240 can determine a responsive movement plan 290 intended to safely navigate the subject vehicle 100 relative to the objects at their predicted future location(s). For example, in response to a prediction 280 that indicates that a pedestrian near a stopped vehicle will proceed along a trajectory toward the street-side of the stopped vehicle, the path planning module 240 can generate a movement plan 290 including a trajectory that would cause the subject vehicle 100 to slow down and change lanes in a direction away from the pedestrian in order to increase the distance between the subject vehicle 100 and the predicted location of the pedestrian as the subject vehicle 100 passes the pedestrian.

The monitoring module 250 can analyze the predictions to identify corresponding predictions that are directed to the same or related matter. For example, a first (e.g., "provisional") prediction generated at a first point in time may correspond with a second (e.g., "subsequent") prediction generated at a second point in time in that both predictions are about a same object, group of objects, aspect of operation of the subject vehicle 100, or the like. The monitoring module 250 can determine how closely the provisional and subsequent predictions correspond and whether the correspondence satisfies an inaccuracy threshold. For example, as will be discussed further below, the monitoring module 250 can determine whether the correspondence satisfies an inaccuracy threshold in multiple ways, one example being determining an alignment score that represents a degree of agreement between corresponding predictions.

The inaccuracy threshold represents a level of diversion between predictions that indicates that the prediction module 230 may have generated an inaccurate prediction, for example, due to an error, misinterpretation of data, misperception, etc. In response to determining that the correspondence satisfies the inaccuracy threshold, the monitoring module 250 can store the provisional prediction and the sensor data 119 (and any other data) associated with the provisional prediction to track potential sources of inaccuracies and log errors that may have occurred in generating the prediction. Such sources errors often would have otherwise remained undetected when no manifestation of the error (e.g., a collision) occurs.

Figure 3:
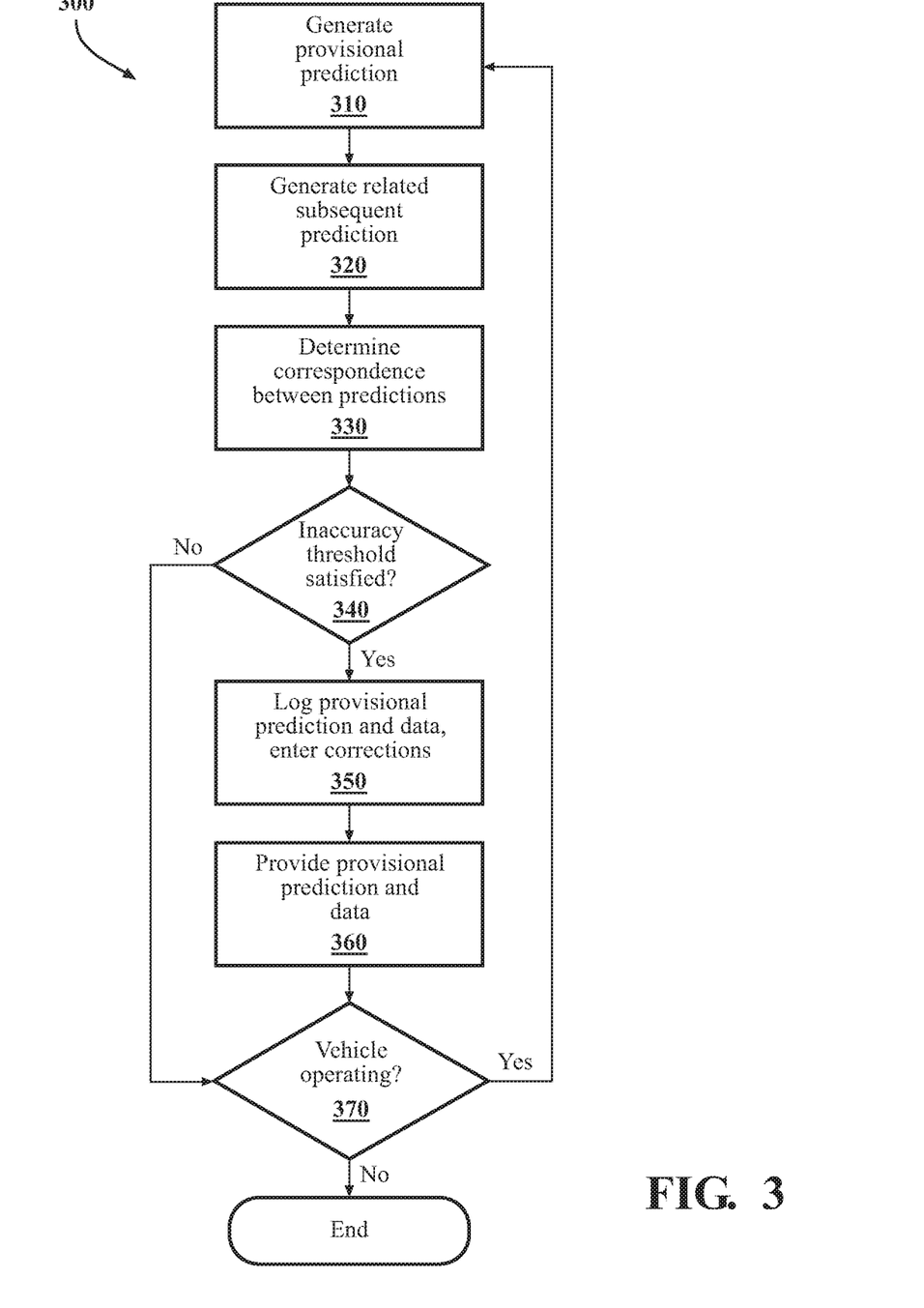
FIG. 3 illustrates a flowchart of a method that is associated with improving predictions for a vehicle according to the disclosed subject matter.

Various aspects of detecting inaccurate predictions will be elaborated on in relation to FIG. 3. FIG. 3 illustrates a flowchart of a method 300 that is associated with improving the functioning of an autonomous/semi-autonomous system through, for example, a unique ordered combination of functions including detecting, logging and correcting sources of inaccurate predictions. The method 300 will be discussed from the perspective of the supervisory system 170 of FIGS. 1 and 2. While the method 300 is discussed in combination with the supervisory system 170, it should be appreciated that the method 300 is not limited to being implemented within the supervisory system 170 but is instead one example of a system that may implement the method 300.

At operation 310, the prediction module 230 generates a first ("provisional") prediction. There are a number of potential sources of anomalies/error that can reduce the accuracy of the provisional prediction. Without limitation, such sources can include inaccurate or otherwise insufficient training data, a specific circumstance for which a given model or algorithm is inappropriate (e.g., isn't trained to recognize), incorrectly recorded sensor data, temporary sensor malfunction, sensor aberrations (e.g., image aberrations), or circumstantially problematic sources. Detecting and correcting these sources can be difficult as, for example, some of these potential error sources manifest only in rare situations (e.g., a particular sequence or combination of events).

Figure 4A:
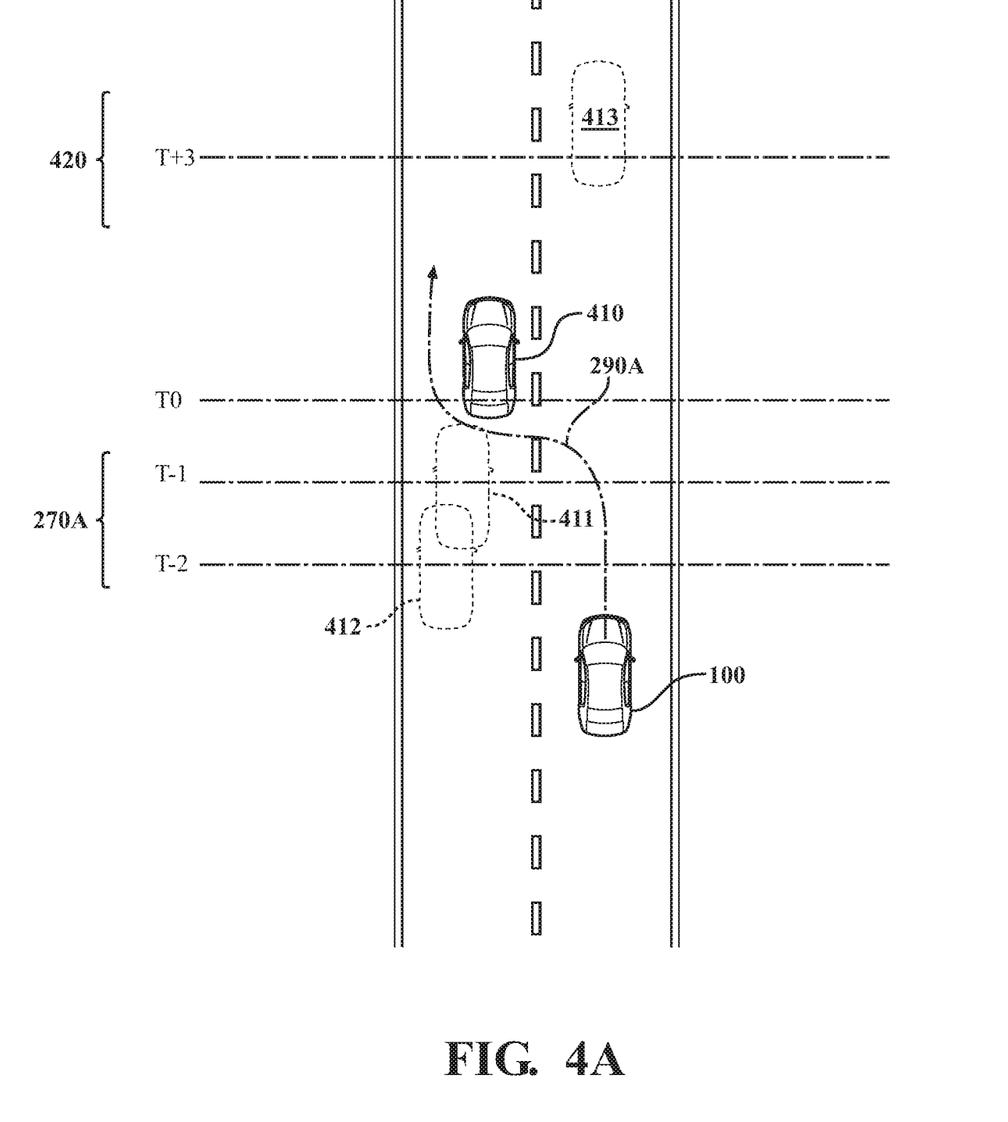
FIG. 4A illustrates an example scene including a provisional prediction by a subject vehicle.

An example of a provisional prediction is illustrated in FIG. 4A. In this example scenario, a subject vehicle 100 is traveling in a lane of a two-lane road at a speed of 50 mph with an object 410 (e.g., another vehicle) traveling in the adjacent lane at time T0. The perception module 220 processes sensor data 119 to generate state data 270A that identifies and labels a position 411 of the object 410 at time T−1 traveling 45 mph and a position 412 of the object 410 at time T−2 traveling 44 mph. It should be clear that this is merely a simplified example for illustrative purposes and not intended to be limiting in any way. In implementation the perception module 220 can generate any type of state data 270A including any number of states, objects, labels, etc., over any length of time.

The prediction module 230 generates a prediction based on the state data 270A. For example, in one or more embodiments the prediction module 230 inputs the state data 270A into a machine-learned model that outputs a provisional prediction 420, e.g., predicting that object 410 will change lanes and be at position 413 in three seconds, i.e., at time T+3, traveling 44 mph. Again, it should be clear that this is merely a simplified example for illustrative purposes and not intended to be limiting in any way. In implementation the prediction module 230 can generate a prediction based on one or more inputs, as discussed above (e.g., sensor data 119, state data 270A, geographic data, time, weather data, etc.).

In response to the provisional prediction 420, the path planning module 240 generates a movement plan 290A for the subject vehicle 100, i.e., to change lanes in 1.5 seconds in order to safely pass the slower moving object 410.

Referring back to FIG. 3, at operation 320 the prediction module 230 generates a second ("subsequent") prediction that is related to the provisional prediction in that both predictions are directed to the same or similar objects or aspects of operating the subject vehicle 100.

Figure 4B:
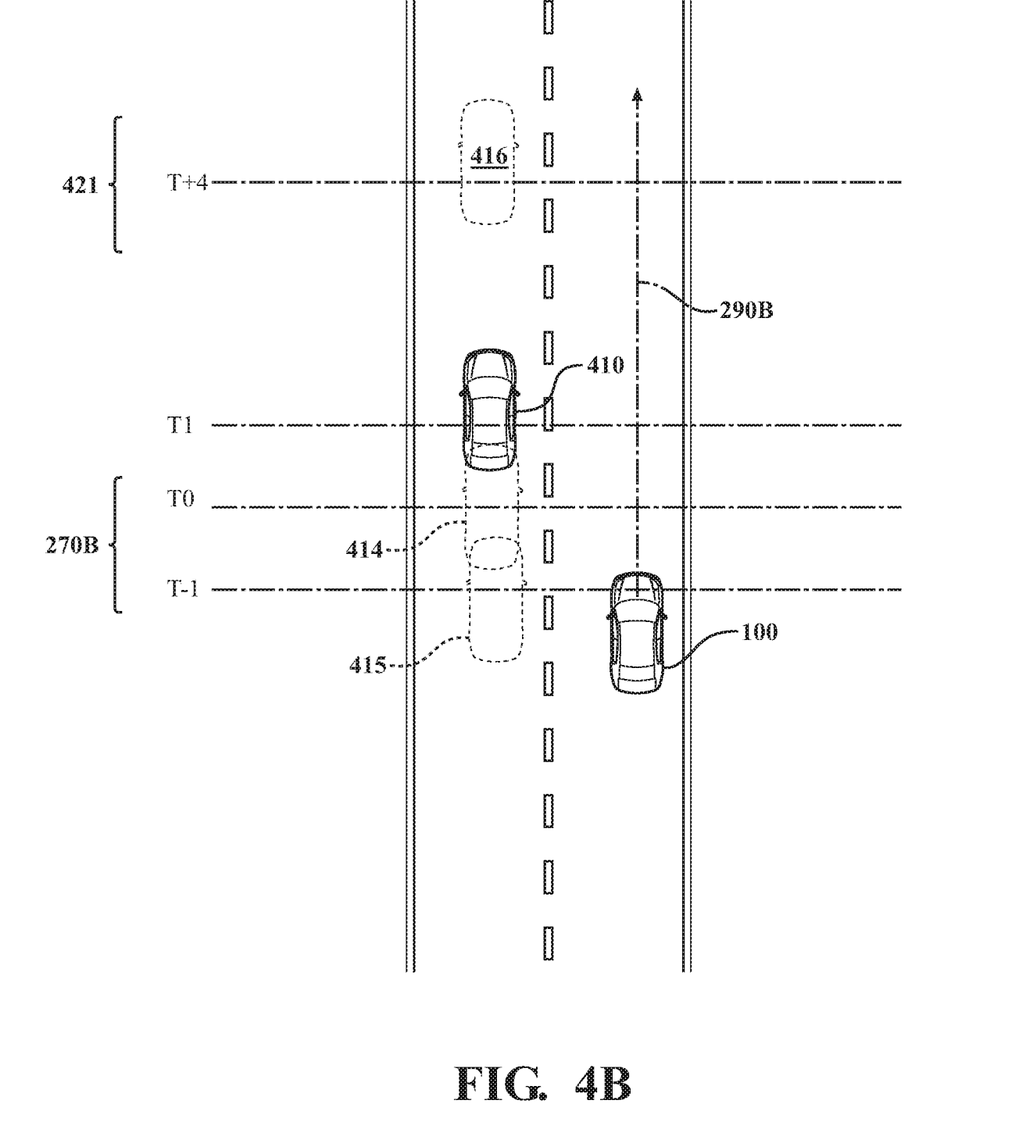
FIG. 4B illustrates an example scene including a subsequent prediction by a subject vehicle.

An example of a subsequent prediction is illustrated in FIG. 4B, which illustrates the subject vehicle 100 traveling at a speed of 50 mph with object 410 traveling in the adjacent lane at time T1, i.e., one second after the instant illustrated in FIG. 4A. The perception module 220 processes sensor data 119 to generate state data 270B that identifies and labels a position 414 of the object 410 at time T0 traveling 45 mph and a position 415 of the object 410 at time T−1 traveling 45 mph.

The prediction module 230 inputs the state data 270B into a machine-learned model that outputs a subsequent prediction 421 that object 410 will not change lanes and will be at position 416 in three seconds, i.e., at time T+4, traveling 45 mph.

In response to the subsequent prediction 421, the path planning module 240 creates a new movement plan 290B for the subject vehicle 100, i.e., to remain in the current lane at the current speed in order to safely pass the slower moving object 410. Accordingly, the subject vehicle 100 never executes the original plan 290A that was created in response to the provisional prediction 420. Instead, the subject vehicle 100 executes the movement plan 290B created in response to the subsequent prediction 421.

Figure 4C:
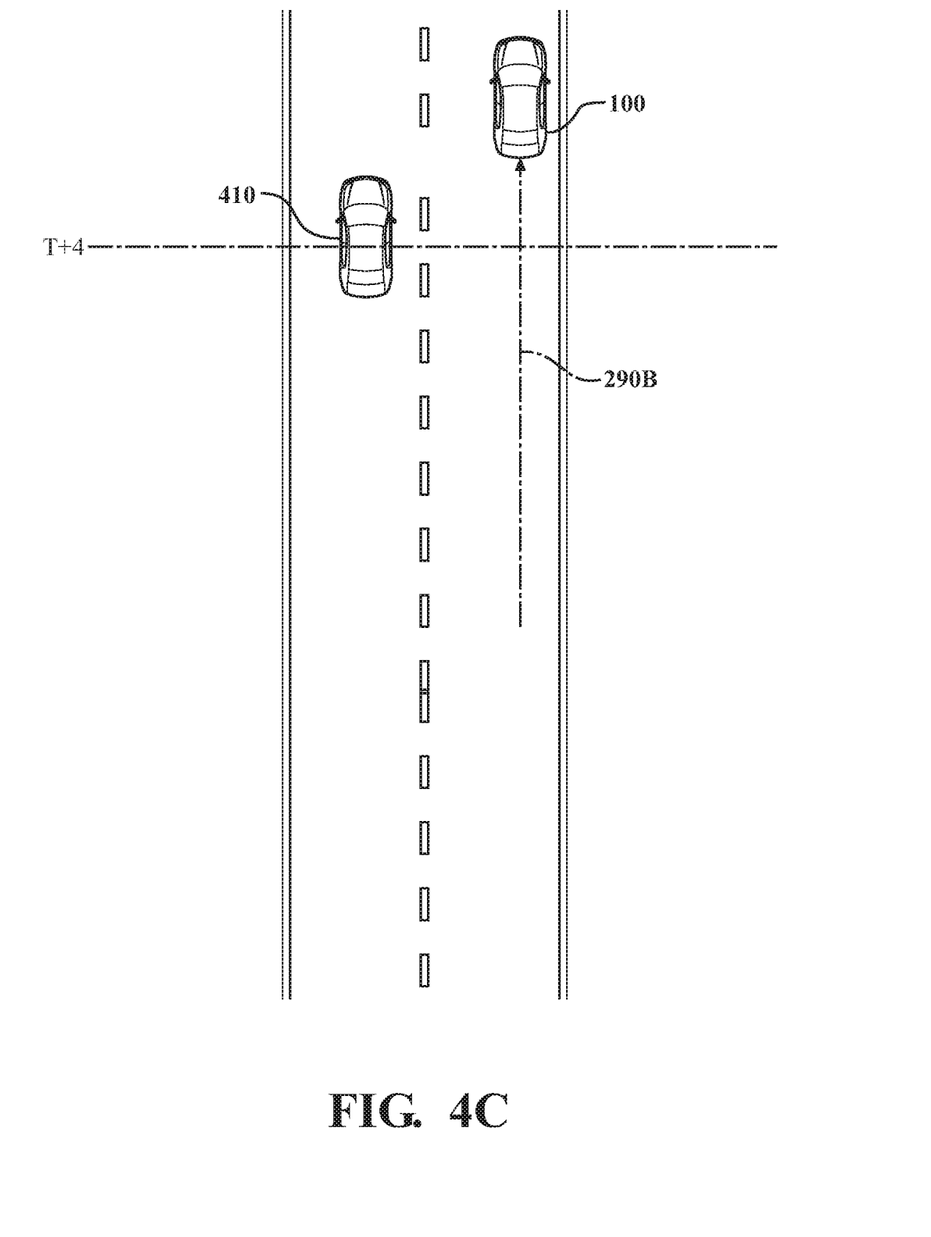
FIG. 4C illustrates an example scene including a subject vehicle following a movement plan.

FIG. 4C shows the execution of movement plan 290B. The subject vehicle 100 stays in the current lane, maintains the current speed, and passes the object 410.

Referring back to FIG. 3, at operation 330 the monitoring module 250 determines a level of correspondence, or agreement, between the provisional prediction and the subsequent prediction. That is, the monitoring module 250 determines to what extent the forecasts of the two related predictions differ from each other or confirm each other.

At operation 340 the monitoring module 250 determines whether the correspondence satisfies an inaccuracy threshold. Related predictions (i.e., predictions about similar subject matter) with forecasts that differ beyond a threshold amount (the inaccuracy threshold) are an indication that one of the predictions may be inaccurate. Furthermore, the inaccuracy may be due to a correctable source of error.

In carrying out operations 330 and 340, there are multiple approaches that the monitoring module 250 can use to determine the level of correspondence between predictions and whether the correspondence satisfies an inaccuracy threshold that indicates potential errors or inaccuracies may have impacted one of the predictions. Such approaches include, without limitation, one or more of: 1) determining an alignment score that represents a degree of agreement between predictions and comparing the alignment score against a threshold that represents an acceptable level of differences, 2) determining whether a responsive action that is planned for the subject vehicle 100 based on the provisional prediction differs beyond a threshold amount from a subsequent responsive action of the subject vehicle 100 that is determined based on the subsequent prediction, 3) determining that an event predicted by the provisional prediction did not occur while a subsequent event predicted by the subsequent prediction did occur, 4) identifying a variation between the provisional prediction and the subsequent prediction by comparing attributes of the provisional prediction and the subsequent prediction, or 5) applying a different comparison technique.

For example, referring to the sequence of events illustrated in FIGS. 4A-4C, in one or more embodiments the monitoring module 250 can determine a level of correspondence between the provisional prediction and the subsequent prediction by determining an alignment score for provisional prediction 420 and subsequent prediction 421. The monitoring module 250 can determine the alignment score, for example, based on the predicted positions (e.g., 413, 416) of one or more objects (e.g., object 410) in each prediction. That is, referring to object 410, if the position 413 predicted by the provisional prediction is the same as position 416 predicted by the subsequent prediction, the alignment score is a satisfactory value (e.g., zero). The greater the difference in the positions of predicted positions 413, 416, the further the alignment score departs from the satisfactory value (e.g., the alignment score can increase in proportion to the difference).

In another embodiment, the monitoring module 250 can determine a level of correspondence between the provisional prediction and the subsequent prediction by determining whether a responsive action that is planned for the subject vehicle 100 based on the provisional prediction differs beyond a threshold amount from a subsequent responsive action of the subject vehicle 100 that is determined based on the subsequent prediction. For example, referring to FIGS. 4A-4C, the monitoring module 250 can determine a level of correspondence between the provisional prediction 420 and the subsequent prediction 421 by determining whether moving plan 290A (generated in response to provisional prediction 420) differs from moving plan 290B (generated in response to subsequent prediction 421) beyond a threshold amount (the inaccuracy threshold).

In yet another embodiment, the monitoring module 250 can determine a level of correspondence between the provisional prediction and the subsequent prediction by determining that an event predicted by the provisional prediction did not occur while a subsequent event predicted by the subsequent prediction did occur. For example, referring to FIGS. 4A-4C, the monitoring module 250 can determine a level of correspondence between the provisional prediction and the subsequent prediction by determining that the object 410 never arrived at the predicted position 413 (as predicted by provisional prediction 420) while the object 410 did arrive at the predicted position 416 (as predicted by subsequent prediction 421).

Referring back to FIG. 3, at operation 340 if the monitoring module 250 determines that the correspondence does not satsify the inaccuracy threshold, then the process continues at operation 370. If the subject vehicle 100 is still in operation, the process cycles back to operation 310. If the subject vehicle 100 is no longer in operation, the process ends.

Alternatively, at operation 340 if the monitoring module 250 determines that the correspondence does satisfy the inaccuracy threshold, then at operation 350 the monitoring module 250 logs the provisional prediction and the data associated with the prediction, e.g., sensor data 119, state data 270, and any data generated in calculations executed by any algorithm or model utilized by the prediction module 230 to track potential sources of error or inaccuracy. In one or more embodiments, the monitoring module 250 can further analyze the data associated with the inaccurate prediction and take corrective action. For example, if the data associated with the inaccurate prediction shows that image data from a particular sensor (e.g., a side mirror camera) is repeatedly involved in inaccurate predictions, the monitoring module can determine that the sensor is malfunctioning or that sensor data from that sensor is unreliable and exclude the data from use in future predictions.

In other embodiments, the monitoring module 250 can adjust a prediction algorithm of the perception module based on the data related to the provisional prediction. For example, monitoring module 250 can adjust training data used in machine learning for the prediction algorithm, adjust a calculation timing of the prediction algorithm relative to an amount of data generated by the sensor system, or adjust input parameters of the prediction algorithm.

At operation 360 the monitoring module 250 provides the provisional prediction and associated data to an external processor, such as a cloud-based system, to log potential errors. For example, the monitoring module 250 can transmit the provisional prediction and associated data directly to the external processor or store the provisional prediction and associated data in a local storage for later transmission in batch. In this manner even if the monitoring module 250 is unable to determine any immediate corrective action, it is possible that data aggregated from multiple vehicles (i.e., in addition to subject vehicle 100) may reveal patterns or trends in rare occurances that can be corrected. The process continues at operation 370. If the subject vehicle 100 is still in operation, the process cycles back to operation 310. If the subject vehicle 100 is no longer in operation, the process ends.

While some of the operations of method 300 are discussed within the context of real-time analysis during operation of a subject vehicle, it should be understood that similar analysis can be conducted at a later time on stored vehicle data within the scope of the disclosed subject matter.

Thus, the disclosed supervisory system 170 improves the operation of autonomous/semi-autonomous vehicles by identifying inaccurate predictions and providing ways to uncover and resolve the sources of inaccuracies to better control the vehicle, e.g., through updated models that integrate the resolutions.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the supervisory system 170, and/or the autonomous driving module(s) 160 can be operatively connected to communicate with the various vehicle systems 140 and/or individual components thereof. For example, returning to FIG. 1, the processor(s) 110, the supervisory system 170, and/or the autonomous driving module(s) 160 can be in communication to send and/or receive information from the various vehicle systems 140 to control the movement, speed, maneuvering, heading, direction, etc. of the vehicle 100. The processor(s) 110, the supervisory system 170, and/or the autonomous driving module(s) 160 may control some or all of these vehicle systems 140 and, thus, may be partially or fully autonomous.

The processor(s) 110, the supervisory system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the supervisory system 170, and/or the autonomous driving module(s) 160 can control the direction and/or speed of the vehicle 100. The processor(s) 110, the supervisory system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the supervisory system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A supervisory system for a subject vehicle, comprising:
one or more processors;
a memory communicably coupled to the one or more processors and storing:
a prediction module including instructions that when executed by the one or more processors cause the one or more processors to generate:
a provisional prediction according to sensor data from at least one sensor of the subject vehicle, the provisional prediction being associated with an aspect relating to operating the subject vehicle along a path, and
a subsequent prediction, according to subsequent sensor data obtained at a subsequent point in time, associated with the aspect relating to operating the subject vehicle along a path; and
a monitoring module including instructions that when executed by the one or more processors cause the one or more processors to:
analyze the provisional prediction in relation to the subsequent prediction about the aspect to determine a correspondence between the provisional prediction and the subsequent prediction,
in response to a determination that the correspondence satisfies an inaccuracy threshold, store the provisional prediction and the sensor data associated with the provisional prediction to log potential inaccuracies in generating predictions based, at least in part, on the sensor data,
determine, based at least in part on the provisional prediction and the sensor data associated with the provisional prediction, a cause for an inaccuracy, the cause for the inaccuracy being one or more of the following: 1) a sensor of the at least one sensor of the subject vehicle is malfunctioning, 2) the sensor data associated with the provisional prediction is unreliable, or 3) the provisional prediction logic is unreliable, and
cause, in response to a determination of the cause for the inaccuracy, data from the at least one sensor to be excluded from use in generating future predictions; and
an autonomous driving module including instructions that when executed by the one or more processors cause the one or more processors to control a movement of the subject vehicle, the movement being in accordance with a movement plan based on the future predictions.

2. The supervisory system of claim 1, wherein the monitoring module further includes instructions to determine that the correspondence satisfies the inaccuracy threshold when a responsive action that is planned for the subject vehicle based, at least in part, on the provisional prediction being different from a subsequent responsive action of the subject vehicle that is determined based on the subsequent prediction.

3. The supervisory system of claim 1, wherein the monitoring module further includes instructions to determine that the correspondence satisfies the inaccuracy threshold when an event predicted by the provisional prediction does not occur and a subsequent event predicted by the subsequent prediction does occur.

4. The supervisory system of claim 1, wherein the monitoring module further includes instructions to determine that the correspondence satisfies the inaccuracy threshold by identifying a variation between the provisional prediction and the subsequent prediction by comparing attributes of the provisional prediction and the subsequent prediction.

5. The supervisory system of claim 1, wherein the provisional prediction and the subsequent prediction predict one or more of: a movement of an object detected in the sensor data, a position, relative to the subject vehicle, of the object detected in the sensor data, or an action of an agent detected in the sensor data.

6. The supervisory system of claim 1, wherein the aspect relates to maneuvers that the subject vehicle executes along the path or events that occur along the path.

7. A method for improving operation of an autonomous/semi-autonomous vehicle, comprising:
generating a provisional prediction according to sensor data from at least one sensor of a subject vehicle, the provisional prediction being associated with an aspect relating to operating the subject vehicle along a path;

generating a subsequent prediction, according to subsequent sensor data obtained at a subsequent point in time, associated with the aspect relating to operating the subject vehicle along a path;

determining an alignment score that represents a degree of agreement between the provisional prediction and the subsequent prediction;

in response to a determination that the alignment score satisfies an inaccuracy threshold, storing the provisional prediction and the sensor data associated with the provisional prediction to log potential inaccuracies that occur in generating predictions based, at least in part, on the sensor data;

determining, based at least in part on the provisional prediction and the sensor data associated with the provisional prediction, a cause for an inaccuracy, the cause for the inaccuracy being one or more of the following: 1) a sensor of the at least one sensor of the subject vehicle is malfunctioning, 2) the sensor data associated with the provisional prediction is unreliable, or 3) the provisional prediction logic is unreliable;

causing, in response to a determination of the cause for the inaccuracy, data from the at least one sensor to be excluded from use in generating future predictions; and controlling a movement of the subject vehicle, the movement being in accordance with a movement plan based on the future predictions.

8. The method of claim 7, further comprising determining that the correspondence satisfies the inaccuracy threshold when a responsive action that is planned for the subject vehicle based, at least in part, on the provisional prediction being different from a subsequent responsive action of the subject vehicle that is determined based on the subsequent prediction.

9. The method of claim 7, further comprising determining that the alignment score satisfies the inaccuracy threshold when an event predicted by the provisional prediction does not occur and a subsequent event predicted by the subsequent prediction does occur.

10. The method of claim 7, further comprising determining that the alignment score satisfies the inaccuracy threshold by identifying a variation between the provisional prediction and the subsequent prediction by comparing attributes of the provisional prediction and the subsequent prediction.

11. The method of claim 7, wherein the provisional prediction and the subsequent prediction predict one or more of: a movement of an object detected in the sensor data, a position, relative to the subject vehicle, of the object detected in the sensor data, or an action of an agent detected in the sensor data.

12. The method of claim 7, wherein the aspect relates to maneuvers that the subject vehicle executes along the path or events that occur along the path.

13. The method of claim 7, further comprising adjusting a prediction algorithm for generating predictions based on the sensor data associated with the provisional prediction.

14. The method of claim 13, wherein the adjusting the prediction algorithm includes changing one or more of: training data used in machine learning for the prediction algorithm, a calculation timing of the prediction algorithm relative to an amount of data generated by the at least one sensor of the subject vehicle, or input parameters of the prediction algorithm.

15. The method of claim 7, wherein storing the provisional prediction and the sensor data associated with the provisional prediction includes storing the sensor data generated by the at least one sensor over a period of time prior to generation of the provisional prediction, a responsive action for controlling the subject vehicle determined based, at least in part, on the provisional prediction, and calculations executed in generating the provisional prediction.

16. The method of claim 7, further comprising transmitting the provisional prediction and the sensor data associated with the provisional prediction to a cloud-based system to log errors.

17. A non-transitory computer-readable medium for detecting inaccurate predictions generated in a vehicle system and including instructions that when executed by one or more processors cause the one or more processors to:

generate a provisional prediction according to sensor data from at least one sensor of a subject vehicle, the provisional prediction being associated with an aspect relating to operating the subject vehicle along a path;

generate a subsequent prediction, according to subsequent sensor data obtained at a subsequent point in time, associated with the aspect relating to operating the subject vehicle along a path;

determine an alignment score that represents a degree of agreement between the provisional prediction and the subsequent prediction;

in response to a determination that the alignment score satisfies an inaccuracy threshold, storing the provisional prediction and the sensor data associated with the provisional prediction to log potential errors in generating predictions based, at least in part, on the sensor data;

determine, based at least in part on the provisional prediction and the sensor data associated with the provisional prediction, a cause for an inaccuracy, the cause for the inaccuracy being one or more of the following: 1) a sensor of the at least one sensor of the subject vehicle is malfunctioning, 2) the sensor data associated with the provisional prediction is unreliable, or 3) the provisional prediction logic is unreliable;

cause, in response to a determination of the cause for the inaccuracy, data from the at least one sensor to be excluded from use in generating future predictions; and control a movement of the subject vehicle, the movement being in accordance with a movement plan based on the future predictions.

18. The non-transitory computer-readable medium of claim 17, wherein the instructions further include instructions to transmit the provisional prediction and the sensor data associated with the provisional prediction to a cloud-based system to log errors.

* * * * *

UNITED STATES PATENT AND TRADEMARK OFFICE
CERTIFICATE OF CORRECTION

PATENT NO. : 11,474,532 B2
APPLICATION NO. : 16/376486
DATED : October 18, 2022
INVENTOR(S) : Avinash Balachandran and Carrie Bobier-Tiu It is certified that error appears in the above-identified patent and that said Letters Patent is hereby corrected as shown below:

In the Claims

Column 17 Claim 1, Line 67 "a path" should be "the path".

Column 19 Claim 7, Line 4 "a path" should be "the path".

Column 19 Claim 8, Line 29 "correspondence" should be "alignment score".

Column 20 Claim 15, Line 5 "wherein storing" should be "wherein the storing".

Column 20 Claim 17, Line 29 "a path" should be "the path".

Signed and Sealed this
Twenty-fourth Day of January, 2023

Katherine Kelly Vidal
*Director of the United States Patent and Trademark Office*